US006892286B2

United States Patent
Hangal et al.

(10) Patent No.: US 6,892,286 B2
(45) Date of Patent: May 10, 2005

(54) SHARED MEMORY MULTIPROCESSOR MEMORY MODEL VERIFICATION SYSTEM AND METHOD

(75) Inventors: Sudheendra Hangal, Bangalore (IN);
Durgam Vahia, San Jose, CA (US);
Juin-Yeu Lu, Campbell, CA (US);
Chaiyasit Manovit, Sanford, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 190 days.

(21) Appl. No.: 10/261,157

(22) Filed: Sep. 30, 2002

(65) Prior Publication Data

US 2004/0064656 A1 Apr. 1, 2004

(51) Int. Cl.[7] .............................................. G06F 12/00

(52) U.S. Cl. ....................... 711/154; 711/141; 712/30

(58) Field of Search .................................. 711/154, 141; 712/30

(56) References Cited

U.S. PATENT DOCUMENTS

| 5,692,153 A | * | 11/1997 | Malik et al. ................. 711/141 |
| 2002/0166032 A1 | * | 11/2002 | Qadeer ....................... 711/141 |

* cited by examiner

Primary Examiner—Hiep T. Nguyen
(74) Attorney, Agent, or Firm—Hamilton & Terrile, LLP; Robert W. Holland

(57) ABSTRACT

A system and method for verifying a memory consistency model for a shared memory multiprocessor computer systems generates random instructions to run on the processors, saves the results of the running of the instructions, and analyzes the results to detect a memory subsystem error if the results fall outside of the space of possible outcomes consistent with the memory consistency model. A precedence relationship of the results is determined by uniquely identifying results of a store location with each result distinct to allow association of a read result value to the instruction that created the read result value. A precedence graph with static, direct and derived edges identifies errors when a cycle is detected that indicates results that are inconsistent with memory consistency model rules.

31 Claims, 2 Drawing Sheets

SHARED MEMORY MULTIPROCESSOR MEMORY MODEL VERIFICATION SYSTEM AND METHOD

BACKGROUND OF THE INVENTION

1. Field of the Invention

The present invention relates in general to the field of shared memory multiprocessor computer systems, and more particularly to a verification system and method for shared memory multiprocessor memory consistency models.

2. Description of the Related Art

Shared memory multiprocessor computer system architectures have become a common solution for complex computing needs, such as are often encountered in computer network servers and telecommunications applications. A typical shared memory multiprocessor computing system includes two or more processors that access shared memory. The same physical address on different processors typically refers to the same location in the shared memory. In shared memory architectures, a memory consistency model typically specifies the semantics of memory operations to coordinate accesses by multiple processors to the shared memory. A memory model effectively establishes a contract between the programmer and the hardware. Thus, both programs and hardware in a shared memory multiprocessor system must be correct with respect to the memory model definition for proper operation. Memory models can have a significant impact on ease of programming and optimizations performable by the hardware or the compiler.

One example of a memory consistency model for shared memory multiprocessor machines is the Total Store Order ("TSO") memory model developed by Sun Mircrosystems, Inc. The TSO memory model specification defines the semantics of load, store and atomic memory operations in uniprocessor or multiprocessor systems from the point of view of program results. TSO defines two types of orders over the set of memory operations. A single partial order, or memory order, conforms to the order in which operations are performed by memory in real time. A per processor total order, or program order, denotes the sequence in which the processor logically executes instructions. Memory operations are ordered by six TSO rules or axioms: the Order rule states that the partial order is total over all stores; the Atomicity rule states that a swap is atomic with respect to other stores; the Termination rule states that all stores and swaps eventually terminate; the Value rule states that the value of a load is the value written by the most recent store to that location; the LoadOp rule states that if an operation follows a load in per processor total order then it must also follow the load in single partial order; and the StoreStore rule states that if two stores appear in a particular order in per processor total order, then they must also appear in the same order in single partial order. The rules are applied to model instructions from processors to provide a set of event orders for coordinated accesses by the processors to the shared memory.

One difficulty with shared memory multiprocessor architectures is that design problems or bugs are difficult to find, isolate and correct. Undetected bugs result in improper operations that often lead to system failures and that delay new design releases or, worse, require post-release patches. One way of verifying a memory model is to use specific algorithms targeted to test the model under test, but these specific algorithm techniques are typically incomplete in their coverage and hence cannot provide high confidence. Another approach is to use random program generators to stress the model under test but random program generators have a major limitation in that they cannot be compared against the architectural model. If data races are generated by random instructions, the results of the instructions are difficult to check unless obvious problem manifestations arise like a system hang or monitor error in simulation. In order to avoid data races, random generation verification typically places accesses in shared memory in a way that allows reasoning through the outcome of the program to check the results, thus limiting the randomness of the program to specific idioms.

SUMMARY OF THE INVENTION

In accordance with the present invention, a system and method are provided for verification of a memory consistency model on a shared memory multiprocessor computer system. Random instructions are generated for the processors to access shared memory locations. The random instructions are run and results saved so that, for each value seen by a processor, the store that created that value is identified. The memory consistency model is verified by inferring that the results of the running of the instructions falls into the space of outcomes that are valid under the memory consistency model. If no valid ordering of events exists which explains all of the constraints of the memory model, then a violation of the memory model is found. For instance, the space of valid outcomes is represented by a precedence graph which is determined by specified memory model axioms: static dependencies between the random instructions; direct dependencies based on the instruction results; and derived dependencies that infer possible results based on each resultant read value. A cycle in the precedence graph implies that a memory model rule was violated since a cycle indicates that the order of events of the results falls outside of the possible order of events that are consistent with the memory model rules.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
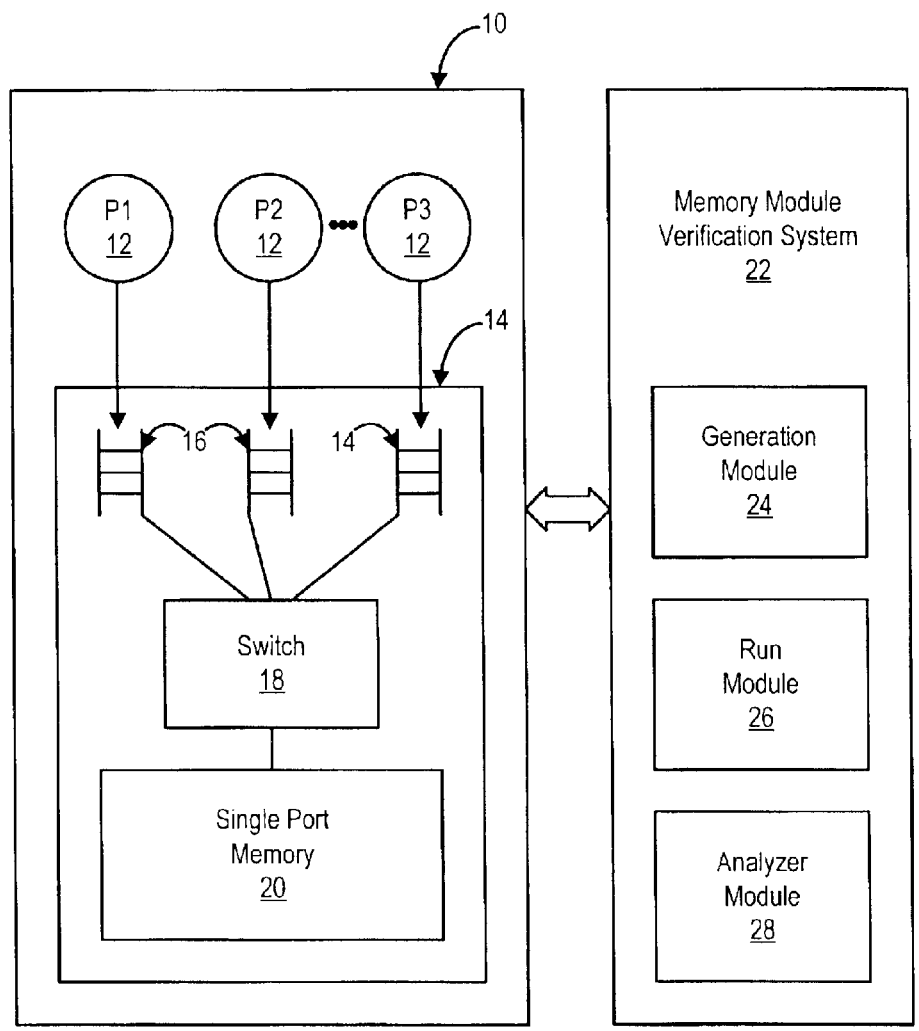
FIG. 1 depicts a block diagram of a verification system for a shared memory multiprocessor memory subsystem.

A memory consistency model verification tool is provided that tests shared memory multiprocessor computer memory subsystems by running random instructions on the computer or a simulation of the computer to detect invalid memory operations. For memory models that specify the semantics of load, store and atomic memory operations, not just the reordering of instructions permitted by the processors, the verification tool detects a variety of hardware and software memory errors by verifying memory model validity. Memory models typically coordinate communications with shared memory at the processor architecture level so that the memory model verification tool checks correctness of all elements responsible for implementing the memory subsystem correctly, including the CPU, the cache hierarchy, memory interface, on-chip or system level interconnects and software emulation routines for memory operations. The verification tool runs with systems that use the memory model under test regardless of hardware details like CPU pipeline, cache hierarchy, out of order execution, cache modes, CPU:system clock ratios, various cache coherency protocols, etc, and is easily adapted to model additional instructions which are extensions of the memory model under test.

The verification tool verifies a memory model with random instructions run on the processors to access shared locations. The memory subsystem is stressed by generating random instructions that access heavily contended shared memory locations with the multiple processors and then analyzing the results of the instructions to detect memory model violations. The results are not analyzed by checking that they match an exact expected result since a given program may run in many different ways on a multiprocessor computer system and generate different but valid results. Rather, the results are checked by inferring whether the results fall into a space of outcomes valid under the memory model. To determine precedence relationships between results, the random generator ensures that each instruction generated writes a distinctly identifiable value. For instance, each instruction that writes to a given memory location writes a random but different value so that the verification tool is able to identify for every value seen which store and therefore which instruction created that value. The memory model is verified if there exists an ordering of events consistent with the memory model rules that could have resulted in the order of the results of the running of the random instructions as determined from the precedence relationships. Detectable errors go beyond errors in the reordering of instructions by processors to include: data corruption such as occurs when store values are written to wrong addresses, stale data such as occurs when a processor misses an invalidate operation, and atomic violations such as occurs when a processor accesses an address when another processor is between the load and store parts of an atomic.

Referring now to FIG. 1, a block diagram depicts one example of an embodiment of a memory consistency model verification tool in accordance with the present invention. A shared memory multiprocessor computer system 10 operates with plural processors 12 that share memory of a memory subsystem 14. Memory subsystem 14 communicates loads and stores with processors 12 through buffers 16 and a switch 18 to access memory locations of a single port memory 20. A memory model verification tool 22 interfaces with computer system 10 to run instructions and verify the correctness of the memory model with the memory subsystem. In one example of an embodiment of the present invention, memory model verification system 22 is configured with an inbuilt random test generator to work with computer system 10. In an alternative embodiment, memory model verification system 22 runs on a hardware design simulator.

Memory model verification system 22 uses a modular design to aid in the reproducibility of problems in either a hardware or simulation environment. A generation module 24 generates random instructions to stress memory subsystem 14 by accessing heavily contended shared memory locations with the plural processors 12. A run module 26 coordinates the running of the random instructions on computer system 10 and saves the results of the running of the instructions. An analyzer module 28 analyzes the saved results to verify that the instructions provided results that are valid with respect to the memory model. Unless at least one valid ordering of events could have produced a result to an instruction, a memory subsystem error is determined and may be isolated by identifying the instruction that produced the invalid result. The analysis module is incomplete in that a given run of random instructions may not detect memory subsystem defects. By way of explanation, a given run will detect errors based on its results if no valid ordering of events explains all of the constraints, but it will not detect errors if the random instructions fail to create invalid results or if invalid results are created but covered up, such as by overwriting a corrupted location before the corrupted location is read by a processor. However, by assuming correct operations unless an invalid result is detected, the analysis module avoids false alarms.

Generation module 24 generates a set of random instruction streams, with an instruction stream for each processor under test. The instruction streams perform accesses to a relatively small number of shared memory locations to improve the likelihood of uncovering errors. For instance, shared memory addresses are chosen to map to a small number of cache blocks and to a small number of sets to cause replacements in caches. Some examples of the types of instructions are accesses to shared memory addresses to perform a variety of loads, stores, swaps, non-faulting loads, prefetches, cas, casx, atomics, instruction flushes, cache flushes and memory barriers. In one embodiment, users specify weights for the relative frequencies of instruction types and accesses to specific locations. Users may also specify increased observability by designating one or more processors to bias towards reads that result in the observation and saving of the state of the memory with increased frequency to reduce the risk that corrupted values will avoid detection. In addition, random sets of synchronizing load and store instructions may be introduced to ensure that different processors do not run too independently of each other. Users may also specify specific instructions through an external generator interface.

One feature of generation module 24 is that it ensures that no two stores in the random instructions will write the same value. Generation module 24 ensures that every value written to a memory word during the test is unique by maintaining two running counters, an integer counter and a floating point counter each with different values, which are incremented after each store of that type. As the results from running the instructions are stored, the results are buffered in a set of registers, with one buffer storing results read into registers associated with the floating point counter and another buffer storing results read into registers associated with the integer counter. The unique values allow verification system 22 to unambiguously identify, for every value seen in the computer system, which store created that value, and thus allows the establishment of precedence relationships between events in the system.

Run module 26 coordinates the running of the generated random instructions and saves the results of the running of the instructions. For instance, run module 26 detects the number of processors, sets up the shared memory, controls the processors and saves the results in a data file. The results of the random instructions program are the values returned by each load and the load part of each atomic. Each result value is saved initially in a results area in memory and then copied to a file for analysis. In order to minimize perturbation to the random instructions program, run module 26 batches up the results in the floating point and integer registers for bulk store of the buffered results.

Analyzer module 28 analyzes the saved results to determine whether any memory operations were performed with results that are invalid under the memory model. Analyzer module 28 represents each load, store and atomic operation to shared memory locations as a node in a precedence directed graph with the nodes having a precedence relationship to indicate the order in which the events occurred. For each value returned for each load/swap instruction, analysis module 28 uses the memory model rules and that value to derive all the precedence relationships that are implied from that value. A cycle in the precedence graph indicates that one of the memory model rules was violated by the test run of the random instructions program.

An example of the application of a memory model rule to a value to determine a precedence graph edge is the application of the TSO memory model Value rule to determine the order of a events. The Value rule states that the order of a load is the value of the most recent store to that location. Thus, for the same address for a load L that sees the value of a store S, all stores preceding the load L must also precede the store S and all stores succeeding the store S must also succeed the load L. Under the TSO memory model, the time a store issues is not required to be modeled. Thus, the store nodes of the precedence graph model the time that the store is seen globally. Since a store can be seen early by a same processor load before the store becomes globally visible, a load can precede a store in the precedence graph even though the load is after the store in program order.

One difficulty with the determination of the precedence edge is that, as the number of instructions represented by the precedence graph increases, the number of edges may increase drastically. The inferred edges for a node of the precedence graph depend on the edges already present in the precedence graph so that, as edges are added the precedence graph changes, edges are re-inferred causing more edges to be added. To solve this difficulty, the graph is determined in iterations with edges added up to a fixed point so that no more edges are added in one full edge-inference pass over the precedence graph. At this fixed point, a set of edges exists consistent with the memory model rules and the random instructions program results. Inconsistencies in this set of edges indicate a violation of the memory model rules by the results and will manifest as a cycle in the precedence graph.

Figure 2:
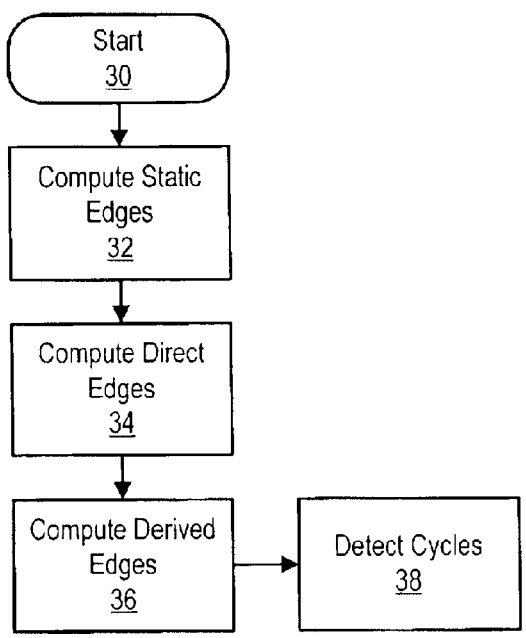
FIG. 2 depicts a flow diagram for determining a precedence directed graph.
Figure 3:
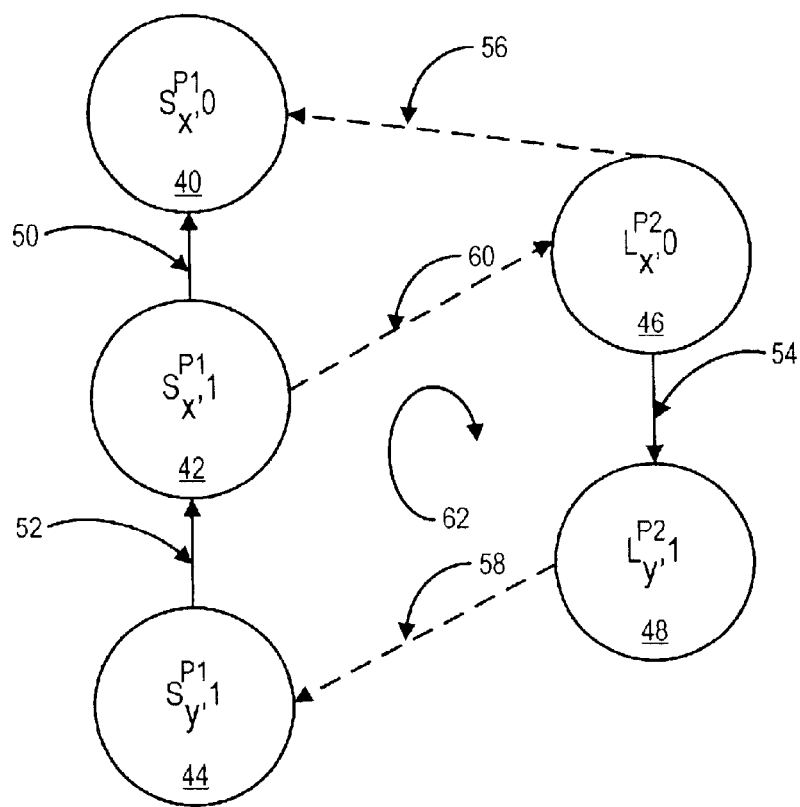
FIG. 3 depicts a precedence directed graph.

Referring now to FIGS. 2 and 3, a flow diagram for determining a precedence directed graph and an example of a precedence directed graph for a given memory location are depicted. The process for determining a precedence graph begins at step 30 with the results of the random instructions and the memory model rules and proceeds to step 32 with computation of the static edges of the precedence graph. The determination of static edges is straightforward process based on static dependencies between the instructions within an instruction stream. For instance, under the TSO memory model rules, all program orders hold except for store to load instructions. FIG. 3 depicts three static edges, labeled as solid lines 50, 52 and 54, computed from the following example of a multiprocessor system test run for processors P1 and P2 under the TSO memory model rules:

P1 P2

[X]:=0

[X]:=1

[Y]:=1

A:=[Y]

B:=[X]

Outcome: A=1, B=0

Static edges 50 and 52 are computed from the store instruction streams with the TSO Store-to-Store order rule. At precedence graph node 40, processor P1 performs a store to address X with a value of 0. Next in precedence by program order, at node 42, the instruction stream calls for processor P1 to perform a store to address X with a value of 1. Third in program instruction order at node 44, processor P1 performs a store to address Y with a value of 1. Static edges 50 and 52 are the order of stores from the instruction stream consistent with the TSO Store-to-Store order rule:

$$S_{[X]}^{P1},0 < S_{[X]}^{P1},1 < S_{[Y]}^{P1},1$$

Where $S_{[addr]}^{Pid}$ denotes that the processor Pid performs a store to the address addr of the subsequent value 0 or 1. Similarly, static edge 54 is computed from load instruction streams with the TSO Load-to-Op order rule. At precedence graph node 46, the instruction stream calls for processor P2 to perform a load from address X of a value of 0, and at node 48, processor P2 performs a load from address Y of a value of 1. Static edge 54 is the order of loads from the TSO Load-to-Op order rule:

$$L_{[Y]}^{P2},1 < L_{[X]}^{P2},0$$

where $L_{[addr]}^{Pid}$ denotes that processor Pid performs a load to the address addr of the subsequent value 0 or 1.

Once static edges of the precedence graph are computed, the process proceeds to step 34 with computation of the direct edges of the precedence graph. Direct edges are computed based on the outcome results of the random instructions program run and the memory model rules. For instance, the precedence graph of FIG. 3 depicts two direct edges 56 and 58 computed from the outcome of A=1, B=0 by using the TSO Value rule, which states that the value of a load from an address is the value written to that address by the most recent store. Direct edge 56 is computed from the outcome of B=0 which implies that the value of 0 loaded in address X by P2 at node 46 was read from the value of 0 stored by P1 at address X at node 40. Direct edge 56 is the order of loads implied from the TSO Value rule:

$$S_{[X]}^{P1},0 < S_{[Y]}^{P2},1$$

Direct edge 58 is computed from the outcome of A=1 which implies that the value of 1 loaded in address Y by P2 at node 48 was read from the value of 1 stored by P1 at address Y at node 44. Direct edge 58 is the order of loads implied from the TSO Value rule:

$$S_{[Y]}^{P1},1 < L_{[Y]}^{P2},1$$

Once direct edges of the precedence graph are computed, the process proceeds to step 36 with computation of the derived edges of the precedence graph. Derived edges are computed by inferring all possible edges from each direct edge. The possible edges are determined by applying the possible memory model rules that could affect each read value for the different types of loads and stores. For instance, a derived edge computed from the signature of the value that a store wrote and the memory model ordering of the instructions allows the analysis of potentially large graphs in a reasonable time. FIG. 3 depicts a derived edge 60 from node 42 to node 46. Processor P1 stored a value of 0 at address X at node 40 before P2 loaded the value of 0 from address X at node 46. Thus, the edge between node 42, with a value of 1 stored at address X, and node 46 implies that node 46 occured before node 42:

$$L_{[X]}^{P2},0 < S_{[X]}^{P1},1$$

Once the static, direct and derived edges of the precedence graph are determined, the process proceeds to step 38 for the detection of a cycle that indicates a violation of a memory model rule. FIG. 3 depicts a cycle in the precedence graph with arrow 62 since the order of derived edge 60 is not explained by a TSO memory model rule. For instance, the store of a value of 1 at node 42 indicates that a corresponding invalidate for the value at [X] was lost for some reason.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for verifying a memory consistency model on a shared memory multiprocessor computer system, the memory consistency model specifying the semantics of memory operations for the plural processors of the multiprocessor computer system, the system comprising:
   a generation module operable to generate random instructions for the processors to access shared memory locations;
   a run module operable to coordinate running of the instructions on the processors and to store the results of the running of the instructions; and
   an analysis module operable to verify the memory consistency model by determining that the results of the running of the instructions matches a valid ordering of events under the memory consistency model.

2. The system of claim 1 wherein the memory consistency model semantics comprise load and store memory instructions, and:
   each store instruction generated by the generation module writes a distinctly identifiable value; and
   the analysis module tracks the distinct values to determine the instruction that wrote the value.

3. The system of claim 2 wherein the analysis module uses the distinctly identifiable values to determine a precedence relationship between instructions.

4. The system of claim 1 wherein the generation module generates instructions and accesses to identified locations with relative frequencies determined according to user-input weights.

5. The system of claim 1 wherein the memory locations are selected by mapping to cache blocks and sets that cause replacements in caches.

6. The system of claim 1 wherein the generation module generates synchronizing instructions that synchronize instruction streams between processors.

7. The system of claim 1 wherein the generation module generates observation instructions that bias a predetermined processor to perform loads to read memory, the observation instructions providing increased observations of the state of the memory.

8. The system of claim 1 wherein the run module is further operable to run the instructions on a simulation of the shared memory multiprocessor computer system.

9. The system of claim 1 wherein the analysis module determines that the results of the running of the instructions matches a valid ordering of events under the memory consistency model by representing the results as a precedence graph having nodes and edges and determining that the results fail to match a valid ordering of events if a cycle occurs in the precedence graph.

10. The system of claim 9 wherein the analysis module represents the results as a precedence graph by:
    determining static edges with memory consistency model dependencies between the instructions;
    determining direct edges based on the results; and
    determining derived edges by inferring edges from the results and order rules of the memory consistency model.

11. The system of claim 10 wherein the analysis module determines that a cycle has occurred in the precedence graph if the edges of a node of the results fails to match the determined static, direct or derived edges.

12. A method for verifying the memory consistency model on a shared memory multiprocessor computer system, the method comprising:
    generating random instructions for the processors to access shared memory locations;
    running the instructions on the processors;
    saving the results of the instructions; and
    verifying the memory consistency model if a valid ordering of events under the memory consistency model could have reached the stored results.

13. The method of claim 12 further comprising:
    identifying the results of each random instruction by storing unique values within each shared memory location; and
    determining the ordering of events of the results by associating results with instructions using the unique values.

14. The method of claim 12 wherein verifying the memory consistency model further comprises:
    stating the results as a precedence directed graph having plural nodes and edges that depict the ordering of events of the results; and
    determining a memory subsystem error if a cycle occurs in the precedence directed graph.

15. The method of claim 14 wherein stating the results as a precedence graph further comprises:
  associating results with the instructions that generated the results; and
  determining the space of valid results for the instructions under the memory model rules.

16. The method of claim 15 wherein determining the space of valid results further comprises:
  determining static edges for plural iterations of the results by applying memory model rule dependencies between the instructions;
  determining direct edges for the plural iterations by applying memory model rules to the results; and
  determining derived edges by inferring the possible results for each read value by applying the memory model rules to the results at each of the plural iterations.

17. The method of claim 16 wherein a cycle occurs if the results for an instruction at a node of the precedence graph do not equal the value of a static, direct or derived edge for the node.

18. The method of claim 12 wherein generating the random instructions further comprises weighting the randomness of the generation of the instructions to alter the relative frequency of access to predetermined memory locations.

19. A method for testing a memory subsystem of a computer having plural processors that share access to the memory subsystem under a memory consistency model, the method comprising:
  generating random instructions to run on the plural processors, the random instructions accessing shared memory locations of the memory subsystem;
  running the random instructions on the plural processors to access the memory subsystem;
  saving the results of the random instructions;
  determining the precedence relationship of the results; and
  determining an error in the memory subsystem if the precedence relationship of the results is inconsistent with the memory consistency model.

20. The method of claim 19 further comprising:
  uniquely identifying the values written to a memory location; and
  determining the precedence relationship for the memory location by associating the uniquely identified values read from that memory location with the instruction that generated each read value.

21. The method of claim 20 wherein determining the precedence relationship comprises determining a precedence directed graph and wherein determining an error in the memory subsystem comprise detecting a cycle in the precedence graph.

22. The method of claim 21 wherein determining a precedence graph comprises:
  determining static edges calculated from memory consistency model dependencies between the random instructions;
  determining direct edges calculated from the results of the random instructions; and
  determining derived edges calculated by inferring all possible edges from the results and the order rules of the memory consistency model.

23. The method of claim 21 wherein determining a precedence graph comprises determining a derive edge calculated from the signature of the value written by a store and from the memory model ordering of instructions.

24. The method of claim 19 wherein generating random instructions further comprises generating a load instruction.

25. The method of claim 19 wherein generating random instructions further comprises generating a store instruction.

26. The method of claim 19 wherein generating random instructions further comprises generating a swap instruction.

27. The method of claim 19 wherein generating random instructions further comprises generating a non-faulting load instruction.

28. The method of claim 19 wherein generating random instructions further comprises generating a prefetch instruction.

29. The method of claim 19 wherein generating random instructions further comprises generating a cas instruction.

30. The method of claim 19 wherein generating random instructions further comprises generating a casx instruction.

31. The method of claim 19 wherein generating random instructions further comprises generating a flush instruction.

* * * * *